W. J. FLEMING.
BASE BALL AMUSEMENT MACHINE.
APPLICATION FILED JULY 6, 1914.
1,120,468.
Patented Dec. 8, 1914.
2 SHEETS—SHEET 1.
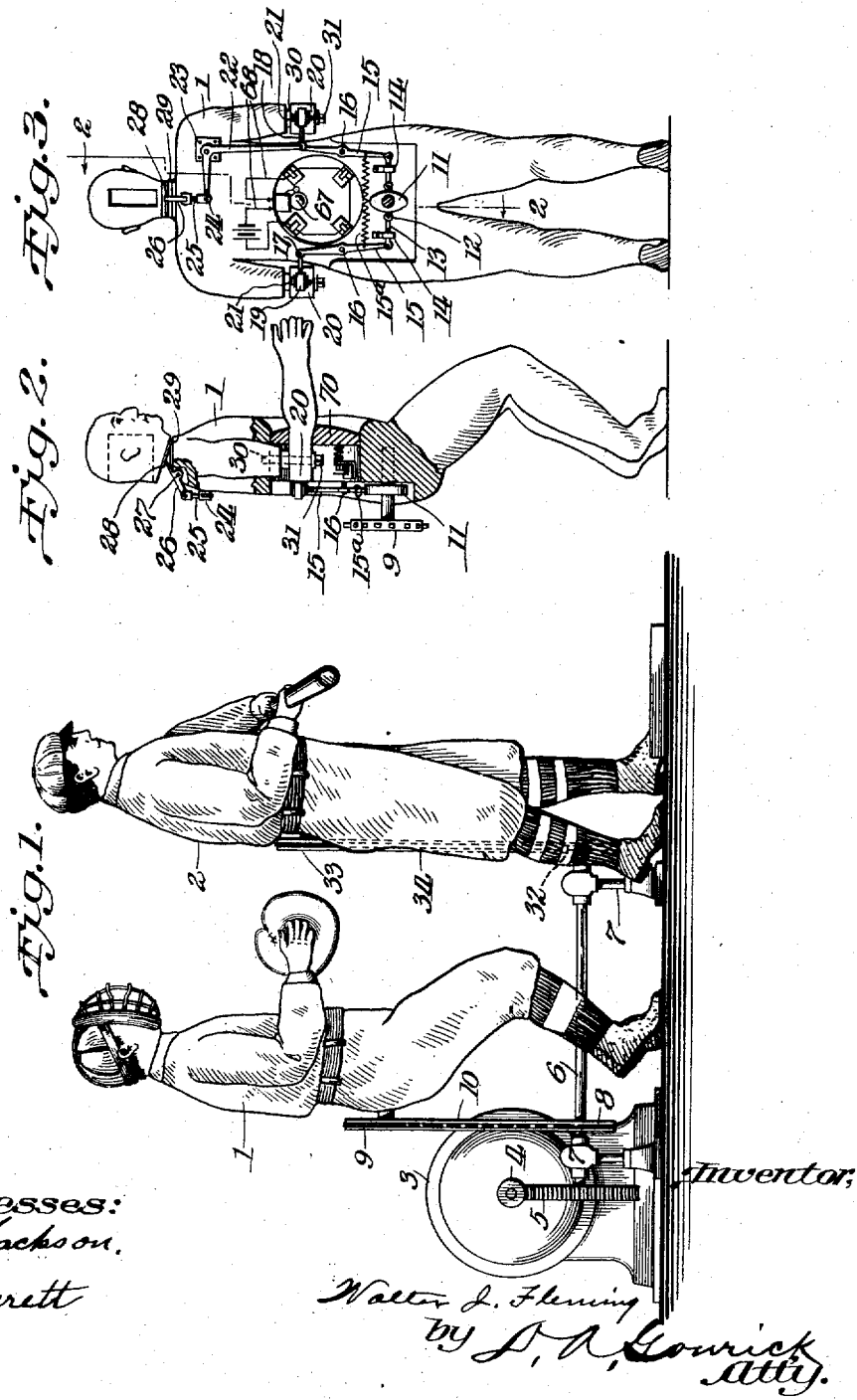

W. J. FLEMING.
BASE BALL AMUSEMENT MACHINE.
APPLICATION FILED JULY 6, 1914.
1,120,468.
Patented Dec. 8, 1914.
2 SHEETS—SHEET 2.
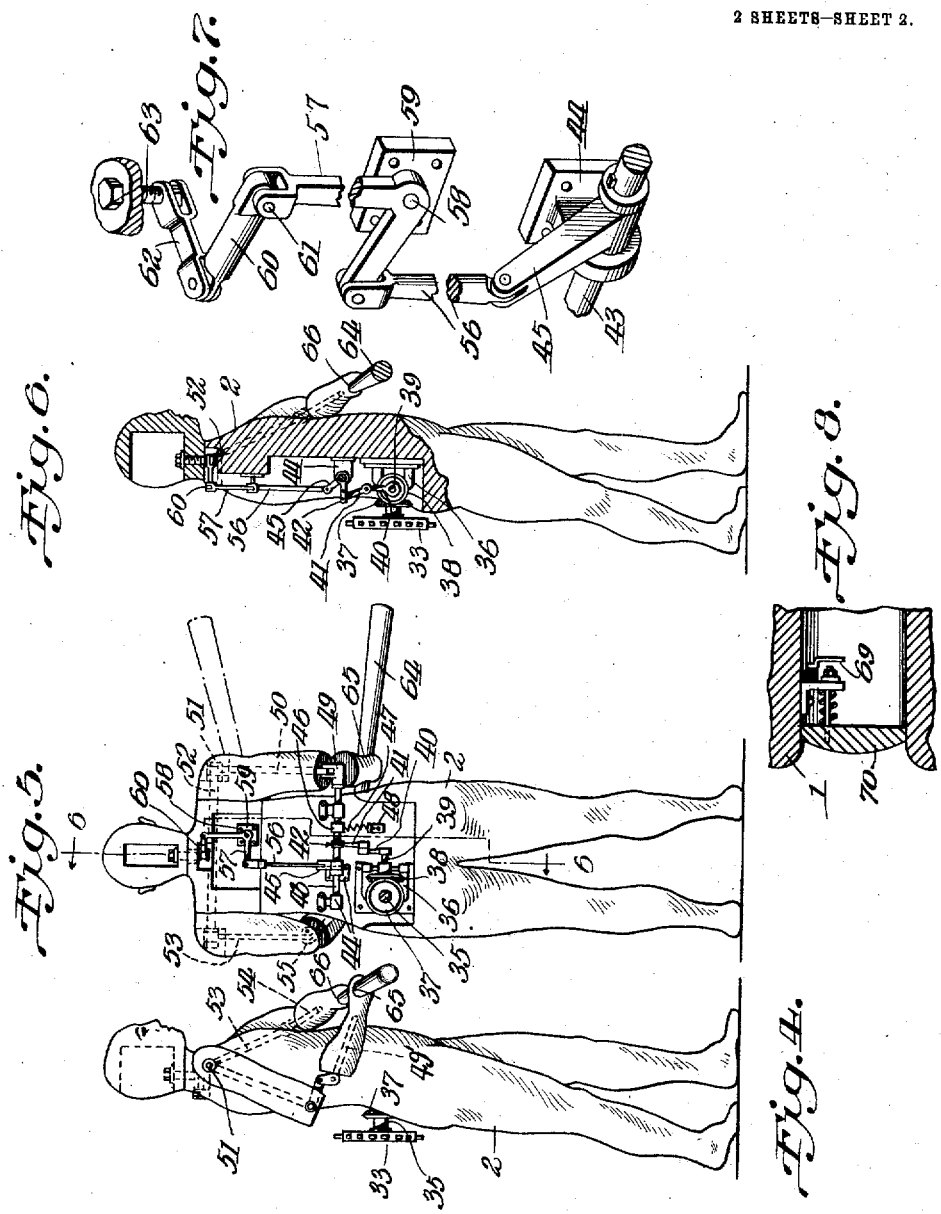

UNITED STATES PATENT OFFICE.

WALTER J. FLEMING, OF SPRINGFIELD, OHIO.

BASE-BALL AMUSEMENT-MACHINE.

1,120,468.   Specification of Letters Patent.   Patented Dec. 8, 1914.

Application filed July 6, 1914. Serial No. 849,216.

*To all whom it may concern:*

Be it known that I, WALTER J. FLEMING, a citizen of the United States, residing at Springfield, in the county of Clark and State of Ohio, have invented certain new and useful Improvements in Base-Ball Amusement-Machines, of which the following is a specification.

My invention relates to games in which apparatus are employed, more particularly base ball games, and has for its object the provision of an apparatus which is adapted for practising pitching and also for amusement, and which can be set up in parks and other out door places for summer amusement, and in halls and other indoor places for practice and diversion in the winter time or during inclement weather.

An important object of my invention is the providing in life size and in appropriate natural positions of a batter and a catcher so constructed as to closely resemble human beings in appearance and movement, and who automatically perform their respective functions of batter and catcher not unlike the performance of such functions by natural persons.

Another object of my invention is to provide an apparatus of this character which will indicate the quality or accuracy of the work performed by the pitcher or person pitching the ball.

Other objects and advantages, such as simplicity, efficiency, and durability of construction will be brought out in the following specification and illustrated in the accompanying drawings, in which:

Figure 1 is a side elevation of my invention showing the catcher and batter in operative position, Fig. 2 is a side view of the catcher partly in section on the line 2—2 of Fig. 3, Fig. 3 is a rear view of the catcher, with a portion of his back removed, showing his operating mechanism, Fig. 4 is a side view of the batter with his wearing apparel removed, Fig. 5 is a rear view of the batter with a portion of his back removed and showing his operating mechanism, Fig. 6 a side view of the batter partly in section on the line 6—6 of Fig. 5, Fig. 7 is an enlarged detail view of the crank movement of the batter shown in Figs. 5 and 6, and Fig. 8 is an enlarged detail view of one of the electric contacts for actuating the bell shown in Fig. 3.

In the drawings similar reference figures designate the same parts in the several views.

The catcher, 1, and the batter, 2, are life size and stand relatively in the usual positions of actual players; that is the catcher 1 stands in the rear and to the right of the batter 2 and on a line with the bat, and they may be mounted upon any base, platform or floor as desired, and connected with any suitable source of power for operating the machinery controlling their actions, but I prefer an electric motor such as shown in Fig. 1, and designated by the reference figure 3, with worm gearing 4 and 5. Gear 5 is rigidly connected with shaft 6 which is directly in the rear of the batter and some eighteen inches to the left of the catcher, and passes through uprights 7, 7, and has mounted on it sprocket 8. Sprocket 9 which drives the inside mechanism of the catcher, 1, is connected with driven sprocket 8 by a chain 10. Sprocket 9 drives or turns cam 11 which communicates with bearings 12 on the end of levers 13, levers 13 being held from vertical movement by hangers 14, levers 15 are pivotally connected with levers 13 and pivoted in their center by pivots 16 to the body portion and held in operative connection with cam 11 by spring 15$^a$ and pivotally connected at 17 to links 18 which are pivotally connected at 19 to the ends of the elbows by means of split sockets 20 through which the enlarged ends of the levers 18 are secured by the bolts 21. A crank arm 22 is pivoted to the lug 23 rigidly attached to the body portion and is also pivoted at 24 to a link 25 with split ends, link 25 in turn being pivoted to lever 26 which is pivoted at 27 and is in contact with the head at 28 and causes a forward and backward movement of the head, the head being hinged at 29 and the arms being pivoted at 30 by the bolts 31.

The batter, 2, receives his operating power from sprocket 32, on shaft 6, engaging sprocket 33 by means of a chain connection 34, sprocket 33 is mounted on a shaft 35 which is mounted on bracket 36 and has beveled gear 37 mounted at approximately its center, beveled gear 37 being in mesh with beveled gear 38 which is rigidly mounted on a stub shaft 39 having an arm 40 mounted thereon and pivotally connected with link 41, link 41 being fastened to arm 42 mounted on shaft 43 which is mounted in hangers 44, and crank 45 is mounted on shaft 43. Lug 46 on said shaft 43 and spring 47 between lug 46 and lug 48, attached to body portion, is to prevent friction and wear on operating parts. A crank arm 49 on the end of said shaft 43 has pivotally mounted in its lower part a rod 49' which extends into the right forearm. Said crank arms 49 has an upwardly extending part split to pivotally receive the link which connects it to lever 50 which is pivoted at 51 and connected to the stationary shaft 52 running across the shoulders. Lever 53 is pivotally connected on the other end of said shaft 52 and running through the upper half of the other arm and pivoted to lever 54 with split end 55 which runs through the lower half of the arm to cause it to move in unison with the right arm. Crank 45, which is mounted on shaft 43 is split at its upper end and pivotally connected to link 56 which is split at its upper end and pivotally connected to crank arm 57 which is pivoted at 58 on bracket 59 and has its upper end split and pivotally connected to arm 60 at 61, arm 60 having its end flattened and pivotally connected to arm 62 which has its ends split, and is connected with bolt 63 which is permanently fastened through the head and revolubly mounted in the body so that the head turns on said bolt. A bat 64 passes through a cylinder in the right hand at 65 to avoid friction and is secured in a socket in the left hand at 66.

Located in the abdomen of the catcher is a bell 67 connected by wiring 68 and contacts 69 with plate 70 which being hit by the ball closes the circuit and causes the bell to ring.

For the purpose of illumination and enhancement of the appearance at night of the heads of the catcher and the batter I place a lamp in each through the opening shown in the back of each head. This lamp may be of any suitable construction but I prefer to use incandescent bulbs having an electric connection with any convenient source of electricity.

It will be apparent from the foregoing description that when the mechanism actuating the catcher is in operation the levers 15 will cause the arms and hands of the catcher to move in and out on a horizontal plane but at no time coming nearer to each other than four inches, and that the crank arm 22 will cause the head to move forward and backward, and that the lever mechanism mounted on shaft 43 will cause the right arm of the batter to rise and lower in a vertical line and carry with it the bat and the batter's left arm, and that link 45 connected with the head by the intermediate arms and bolt 63 will cause the head of the batter to turn from the front to the right and from the right back to the front alternately and in unison with the up and down movement of the bat.

The operation and employment of the device in practice is as follows: The figures being set in position and the pitcher's box located at a distance of sixty feet in front of the batter, and the power applied to the figures causing them to move their arms and heads as described above, the pitcher, provided with one or more balls, takes his position at the box and proceeds to throw or pitch at the figures endeavoring to hit the bat or the plate mounted in the abdomen of the catcher. If the ball hits the bat it counts one; if the ball misses the bat and passes through the catcher's hands hitting the plate and ringing the bell it counts a strike and one for ringing the bell. If the ball instead of hitting the bat, or passing between the catcher's hands, or hitting the plate, hits the batter or catcher it counts a foul.

Having thus described my invention what I claim is:

1. In an amusement device, in combination, two figures, one forming a mark for a missile, and the other being located to the front and to the left of said first named figure, said figure having means connected with its arms for interfering with the missile, the heads and arms of said figures being moved in unison, and means for operating the mechanism of said figures.

2. In an amusement device, in combination, two figures, one of said figures having means for causing a continuous interference in front of the other figure which has a mark for a missile which must pass the front figure, said other figure having its head and arms moving continuously; its head moving backward and forward and its arms with a clasping motion.

3. In an amusement device, in combination, two figures, one representing a catcher and having a mark to be hit by a missile, the arms and head of said last mentioned figure having a continuous movement; said arms moving with an inward and outward movement, and a second figure located to the front and left of said first mentioned figure, said second mentioned figure representing a batter ready for action and having his head and arms moving continuously, and a bat to act as an interference to the missile being thrown clasped in said arms, said figures receiving their operating power from the same driven shaft.

4. In a base ball game apparatus, a catcher having movable arms and means for causing a continuous opening and closing movement to said arms, and a batter having movable arms carrying a bat and adapted to raise and lower said bat.

5. In a base ball game apparatus, a catcher, and a batter spaced from and in front of said catcher; said catcher having arms and hands spaced apart, said arms and hands having means for causing a continuous opening and shutting movement, and an abdominal plate, and said batter having movable arms with hand ends adapted to move in a vertical line and a bat secured in said hand ends.

6. A base ball apparatus for practice and amusement comprising two figures shaped and costumed in likeness to human beings, one of said figures being that of a base ball catcher and the other figure being that of a base ball batter, the head and the arms of each of said figures being movable, said heads and arms having a continuous movement similar to base ball players in action, a base ball bat carried by the arms of the batter figure, an annunciator bell disposed on the catcher figure, means for operating said bell, and means for operating the heads and arms of said figures.

7. In a base ball game apparatus, a catcher and a batter, said catcher being provided with horizontally movable arms and means for moving his head forward and back in unison with the horizontal movement of his arms, and said batter having movable arms and a bat secured thereto and means for moving his head sidewise, said arms being adapted to move said bat upward and downward, and said means for moving said head adapted to move it in unison with said bat.

8. In a base ball game apparatus, a catcher and a batter, movable heads and movable arms on said catcher and said batter, a movable bat secured to the arms of said batter, and a movable plate mounted in the abdomen of said catcher, and an electric bell in said abdomen and electrical connection between said plate and said bell.

9. In a device of the character described, the combination with a plurality of figures, of means carried by one of said figures for obstructing the passage of an object, said means comprising movable arms and a bat rigidly connected in one arm and loosely mounted in the end of the other arm.

10. In a device of the character described, the combination with a plurality of figures, of means carried by one of said figures for obstructing the passage of an object, said means comprising movable arms and a bat rigidly connected in one arm and passing through the end of the other arm, mechanism for operating said arms, said mechanism comprising a driven sprocket, a plurality of beveled gears and a series of pivotally connected links fastened to a shaft the one end of said shaft being fastened to a crank arm pivotally connected with the elbow of one arm, and mechanism connected with said shaft for moving the head of said figure.

11. In a device of the class described, a plurality of figures, means carried by one of said figures for obstructing the passage of an object, said means comprising movable arms and a bat rigidly connected in one arm and passing through the end of the other arm, and mechanism for operating one arm, said mechanism comprising a suitable source of power, a main driving shaft and a sprocket and chain connection with a driven shaft, a plurality of beveled gears and a series of pivotally connected links connecting said driven shaft and a second driven shaft, one end of said last mentioned shaft being fastened to a crank arm pivotally connected with the elbow of one arm of said figure, and means connected with said last named shaft for moving the head of said figure, said means comprising a crank fastened to said shaft, a lever pivotally fastened to said crank and to a bell crank and link connection with said head.

12. In an amusement device, in combination, two figures, one located to the front and left of the other, the rear figure having a portion of its body formed for a target for a thrown missile, the front figure forming an interference, the arms and head of the rear figure moving in unison, the head moving from front to rear and the arms with a clasping motion, the head and arms of the front figure moving in unison, the head moving from left to right, and the arms with a striking motion, said arms carrying an instrument in form of a bat and moving upwardly and inwardly and returning with a downward and an outward stroke, and means for furnishing operating power to said figures.

13. In a device of the character described, the combination with two figures, of means carried by one of said figures for obstructing the passage of an object, and means carried by the other of said figures for recording the passage of said object beyond the first figure, said means comprising a movable part of the stomach portion of said second figure, and means connected with said movable part for recording said passage of said object, said means comprising a bell having electric connection with said movable part, and means for moving the arms of said figures in life like manner.

14. In a device of the character described, the combination with two figures, of means carried by one of said figures for obstructing the passage of an object, and means carried by the other of said figures for recording the passage of said object beyond the first figure, said last mentioned means comprising a movable part of the stomach portion of said second figure, and means connected with said movable part for recording said passage of said object, said last mentioned means comprising a bell having electrical connection with said movable part, and means for moving the arms of said figures in life like manner, said last mentioned means comprising a suitable source of power and a main shaft having sprocket and chain connection with a second shaft, a cam mounted on said second shaft, levers with roller bearing faces contacting with said cam, levers pivotally connected with said last named levers and having link connection with the elbows of said figures.

15. In a device of the character described, the combination with two figures, of means carried by one of said figures for obstructing the passage of an object, and means carried by the other of said figures for recording the passage of said object beyond the first figure, said last mentioned means comprising a movable part of the stomach portion of said second figure, and means connected with said movable part for recording said passage of said object, said last mentioned means comprising a bell having electrical connection with said movable part, and means for moving the arms of said figures in life like manner, said last mentioned means comprising a suitable source of power and a main shaft having sprocket and chain connection with a second shaft, a cam mounted on said second shaft, levers with roller bearing faces contacting with said cam, levers pivotally connected with said last named levers and having link connection with the elbows of said figures, and means for operating the heads of said figures.

16. In a device of the character described, the combination with two figures, of means carried by one of said figures for obstructing the passage of an object, and means carried by the other of said figures for recording the passage of said object beyond the first figure, said last mentioned means comprising a movable part of the stomach portion of said second figure, and means connected with said movable part for recording said passage of said object, said last mentioned means comprising a bell having electrical connection with said movable part, and means for moving the arms of said figures in life like manner, said last mentioned means comprising a suitable source of power and a main shaft having sprocket and chain connection with a second shaft, a cam mounted on said second shaft, levers with roller bearing faces contacting with said cam, levers pivotally connected with said last named levers and having link connection with the elbows of said figures, and means for operating the heads of said figures, said means comprising bell crank levers pivotally connected with said arm actuating levers and connected by links to the operating levers of the heads.

In testimony whereof I hereto affix my signature in the presence of two witnesses.

WALTER J. FLEMING.

Witnesses:
JOHN L. DICKEY,
F. M. WALLACE.

Copies of this patent may be obtained for five cents each, by addressing the "Commissioner of Patents, Washington, D. C."